US008412411B2

(12) United States Patent
Burnham

(10) Patent No.: US 8,412,411 B2
(45) Date of Patent: Apr. 2, 2013

(54) ELECTRONIC CONTROL MODULE HEAT LIMITING SYSTEMS AND METHODS

(75) Inventor: David Burnham, Berkley, MI (US)

(73) Assignee: Robert Bosch GmbH, Stuttgart (DE)

( * ) Notice: Subject to any disclaimer, the term of this patent is extended or adjusted under 35 U.S.C. 154(b) by 567 days.

(21) Appl. No.: 12/636,831

(22) Filed: Dec. 14, 2009

(65) Prior Publication Data
US 2011/0144860 A1  Jun. 16, 2011

(51) Int. Cl.
G06F 7/00 (2006.01)
G06F 17/00 (2006.01)
G05D 9/12 (2006.01)
B60K 1/00 (2006.01)
(52) U.S. Cl. ............ 701/36; 701/49; 700/295; 180/65.8
(58) Field of Classification Search .............. 701/1, 29, 701/33, 36, 48, 49, 70, 71, 44; 322/33, 44; 361/699, 700; 123/142.5 E, 406.4, 179.2, 123/299, 479; 700/295; 180/65.31, 65.8; 307/10.1; 315/80; 318/139
See application file for complete search history.

(56) References Cited

U.S. PATENT DOCUMENTS

| 5,136,998 | A | * | 8/1992 | Deutsch | 123/406.4 |
| 5,416,702 | A | * | 5/1995 | Kitagawa et al. | 701/36 |
| 5,848,366 | A | * | 12/1998 | Ueda | 701/36 |
| 5,895,434 | A | | 4/1999 | Fennel et al. | |
| 6,456,922 | B1 | | 9/2002 | Gamberg | |
| 7,240,660 | B1 | * | 7/2007 | Bryant et al. | 123/299 |
| 7,251,553 | B2 | | 7/2007 | Kaster | |
| 7,258,092 | B2 | * | 8/2007 | Beaucaire et al. | 123/142.5 E |
| 7,561,424 | B2 | * | 7/2009 | Bjork et al. | 361/699 |
| 7,847,525 | B2 | * | 12/2010 | Okamoto | 322/33 |
| 2004/0130210 | A1 | | 7/2004 | Wanke et al. | |
| 2008/0067983 | A1 | | 3/2008 | Okamoto | |

FOREIGN PATENT DOCUMENTS
DE  102006019981 A1  1/2007

OTHER PUBLICATIONS

Mohammadreza Keimasi, Rejeev Mishra, and Diganta Das "The Temperature Ratings of Electronic Parts" Feb. 1, 2004, ElectronicsCooling, 1st Paragraph www.electronics-cooling.com/2004/02/the-temperature-ratings-of-electronic-parts/.*
Hietanen, E. Dale, et al., "A Computer Controlled System for Testing of Electronic Control Units at Extreme Temperatures", Society of Manufacturing Engineers Technical Paper EE77-930, 1977, 11 pages.

* cited by examiner

Primary Examiner — Thomas Black
Assistant Examiner — Dale W Hilgendorf
(74) Attorney, Agent, or Firm — Michael Best & Friedrich LLP

(57) ABSTRACT

An electronic control module for a vehicle. The electronic control module includes a housing, a temperature sensor positioned in the housing, and a controller positioned in the housing and coupled to the temperature sensor. The controller includes a processor, a memory, and a plurality of switches. The controller performs a first function related to a comfort level of an occupant of the vehicle at a first level of functionality. The controller also detects a temperature in the housing, and modifies the first function when the detected temperature exceeds a temperature threshold. The modification of the first function reduces a quantity of heat generated by the controller.

15 Claims, 3 Drawing Sheets

ELECTRONIC CONTROL MODULE HEAT LIMITING SYSTEMS AND METHODS

BACKGROUND

Electronic circuits must be designed to withstand the maximum temperature the components of the circuit will encounter. Many factors impact the temperature of the components including the ambient temperature of air around the circuit, whether the circuit is exposed to additional heat (e.g., whether the circuit is in direct sunlight or positioned near a heat generating element such as an automobile engine), whether the circuit is in an enclosed space, cooling elements (e.g., air flow around the circuit, either natural or fan-driven), and heat generated by the circuit itself. For example, the greater the number of operations being performed by a component (such as a transistor), and the more often the component operates (or is switched on) the more heat the component generates. Further, the more current a component or circuit uses, the more heat it generates (at least in general). It is even possible for components to generate heat as a result of switching losses when they transition from an on state to an off state.

Circuits having components that will experience temperatures in excess of 125° C. are often designed using expensive military grade or other "heavy duty" components. These components are more costly than industrial (−40 to 85° C.) or commercial (0-70° C.) grade components, resulting in higher cost for the circuit than if industrial or commercial grade components were used. Circuits are also designed using components that will generate less heat (e.g., FETs having a low drain to source on-resistance ($R_{DS}$(on)) or using additional components to reduce the current passing through each component, and thus reducing the heat generated by each component (e.g., using two FETs to drive a single motor).

Each of these design techniques result in increased costs for the circuits simply to ensure the components will not fail due to over heating.

SUMMARY

The present invention relates to systems and methods of reducing heat generated by components of a circuit to allow less costly components to be used in the circuit. Specifically, non-critical functions performed by a circuit (e.g., an automobile electronic control module ("ECM")) are modified or terminated when a temperature of the circuit becomes elevated to ensure that operation of critical functions performed by the circuit will not result in a rise in temperature above an operating temperature threshold (which could cause component failures).

One embodiment provides an electronic control module for a vehicle. The electronic control module includes a housing, a temperature sensor positioned in the housing, and a controller positioned in the housing and coupled to the temperature sensor. The controller includes a processor, a memory, and a plurality of switches. The controller performs a first function related to a comfort level of an occupant of the vehicle at a first level of functionality. The controller also detects a temperature in the housing, and modifies the first function when the detected temperature exceeds a temperature threshold. The modification of the first function reduces a quantity of heat generated by the controller.

Another embodiment provides a method of operating an electronic control module for a vehicle to reduce a rise in temperature within a housing of the electronic control module. The electronic control module includes a temperature sensor, a processor, a memory, and a plurality of switches. The method includes the acts of performing a plurality of functions to increase a comfort level of an occupant of the vehicle, detecting a temperature in the housing, determining whether the detected temperature exceeds a temperature threshold, and modifying the plurality of functions when the detected temperature exceeds the temperature threshold. The plurality of functions has a first level of functionality before they are modified. The modification of the functions reduces a quantity of heat generated by the electronic control module.

Other aspects of the invention will become apparent by consideration of the detailed description and accompanying drawings.

DETAILED DESCRIPTION

Figure 1:
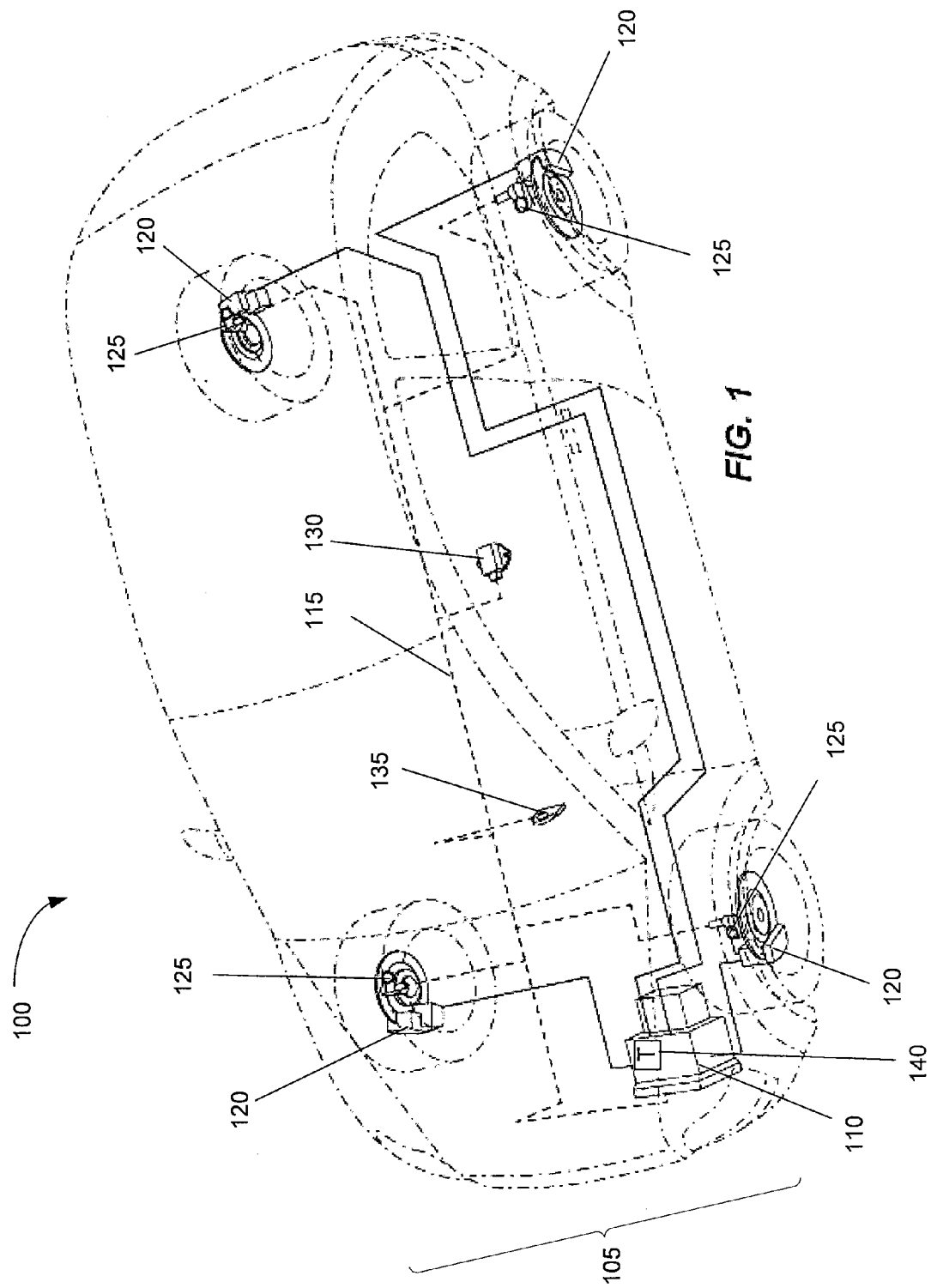
FIG. 1 is an exemplary schematic diagram of an automobile.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Automobile ECMs constitute one type of electrical circuit where temperature is a significant design criterion.

ECMs must be designed to operate at the maximum temperature that the ECM may encounter. For example, components of a vehicle towing a heavy load in direct sunlight in a desert would experience high temperatures due to the heat from the environment and the heat generated by the engine. In addition, the heat generated by components of the ECM would increase should the vehicle encounter a situation where the ECM needed to perform, for example, an electronic stability control ("ESC") corrective function (e.g., correct a skid by implementing a braking function). Performing the ESC functions would result in the processor performing a large number of additional operations and quickly cycling transistors of the ECM. This is in addition to all of the other functions, not related to the ESC functions, which are being performed by the ECM. Execution of ESC function(s) results in the components of the ECM producing large amounts of additional heat. This is an extreme situation that is not likely to be encountered often, if at all, by most vehicles. Still, for the safety of occupants of a vehicle, the ECM, and its components, must be designed to operate under just such conditions.

As such, prior ECM's have been designed to ensure that critical functions performed by the ECM are not compromised due to temperature. These designs result in increased cost for the ECM to handle temperatures that are rarely, if ever, encountered.

Components of ECMs generally must be rated for automotive use. However, to compensate for the temperatures encountered by the components of an ECM, designers must use special components (e.g., FETs with low $R_{DS}$(on)), or must use multiple components (e.g., parallel FETs) to reduce temperature rises caused by the components of the ECM. Several factors impact the temperatures encountered by ECM. For example, ECMs are generally contained in sealed housings (e.g., to protect the circuits from environmental elements such as water and dirt). Sealed housings also limit or eliminate air cooling. In addition, ECMs are generally positioned within the engine compartment where the heat of the engine raises the temperature within the ECM. ECMs also drive components that draw large amounts of current (e.g., solenoids) or require high switching rates (e.g., anti-lock brake systems) both of which result in the components of the ECM generating large amounts of heat. Thus, designers of ECMs must take special care to ensure that the components of an ECM will not be exposed to temperatures above their operating temperature thresholds. These designs generally result in increased cost for the ECM.

A typical ECM may perform a large number of vehicle system control functions. Some of the functions performed by the ECM's are for the safety of the occupants of the vehicle or critical to proper operation of the vehicle, e.g., ESC functions, air bag and active restraint functions, engine management functions, and the like. Other functions are performed by an ECM are less important (e.g., not necessary for safety or basic vehicle operations), including functions performed for the convenience or comfort of the vehicle occupants (e.g., controlling motors in a manner that reduces audible noise). Functions that are for the safety of occupants, to prevent damage to the vehicle, or support basic vehicle operations are considered critical functions. Functions that are performed for the comfort of the occupants, while desirable, are considered non-critical functions. Examples of critical functions include anti-lock braking, electronic stability control, fuel injection, and airbag controls. Functions that are non-critical can include wave-shaping functions to reduce Electra-Magnetic Interference (EMI) emissions and Noise Vibration and Heat (NVH) Control (e.g., speed control of electric motors in windows to reduce audible noise).

Because functions that improve the comfort and convenience for the occupants of the vehicle are not necessary for the safety of the occupants or the operation of the vehicle, they can be reduced or eliminated when necessary to reduce the temperature of the ECM. Further, the reduction or termination of non-critical functions results in a lower temperature in the ECM during the execution of critical/safety functions. Returning to the earlier example, in a situation where a vehicle is traveling down a road on a hot summer day with an outside temperature of 100° F., if the temperature in the ECM exceeds a threshold, the ECM might turn off one or more wave-shaping functions or operate the wave-shaping functions to a lesser degree so that the overall processing/computational activity of the ECM is reduced, helping control the amount of heat generated by the ECM. Then, if an emergency avoidance maneuver is initiated by the driver to avoid an obstacle in the road (causing the ESC to initiate stability counter actions), the temperature in the ECM will not exceed the maximum rated temperature of the components of the ECM as a result of the heat caused by executing the ESC functions. Reducing the amount of heat generated enables the ECM to be manufactured in a less costly manner (e.g., a reduced number of components or cheaper components).

FIG. 1 illustrates a vehicle 100 including vehicle control system 105 having an ECM 110, and a plurality of sensors. Information obtained by the sensors can be transmitted to the ECM 110 over a direct connection or a network, such as a controller area network ("CAN") 115. The ECM 110 includes an electronic stability control ("ESC") application or module that is designed to detect instability of the vehicle and help correct the situation. For example, when the ECM 110 detects a loss of steering control, the ECM 110 may automatically apply one or more individual brakes 120 to help steer the vehicle 100 in a desired direction. In some embodiments, the ECM 110 also reduces engine power when it detects a skid or slide of the vehicle 100 until the vehicle operator regains control of the vehicle 100.

As shown in FIG. 1, the vehicle control system 105 includes a plurality of sensors such as a plurality of wheel speed sensors ("WSS") 125, a yaw rate sensor ("YRS") 130, and a steering angle sensor ("SAS") 135. The sensors are connected to the bus 115 and send information to other components also connected to the bus 115, such as the ECM 110. Information sent by the YRS 130 over the bus 115 includes information about the rotational velocity of the vehicle around a vertical axis at the center of the vehicle. The SAS 135 senses how far and in what direction a steering wheel has been turned, transmitting this data over the bus 115. The WSS 125 sense the speed of the wheels and transmit this data to the ECM 110 via the bus 115.

To control operation of the vehicle 100, the ECM 110 controls a plurality of devices such as motors, hydraulic systems (e.g., brake pumps), solenoids, switches, etc. The ECM 110 can control the devices via the bus 115 or via direct connections. The ECM 110 is enclosed in a housing and includes one or more printed circuit boards. The printed circuit boards include a controller having components for receiving data from the sensors, executing applications, and driving outputs. The components include processors (e.g., microprocessors, microcontrollers, ASICs, etc.), memory (e.g., RAM, EEPROM, FLASH, etc.), opto-isolators, passive components (e.g., resistors, capacitors, etc.), switches (e.g., IGBTs, FETs, etc.), and other components. The housing may be sealed to protect the components from the environment (e.g., from water and dirt). In other constructions, the printed circuit board(s) and components may be sealed in a conformal coating to protect them from the environment.

In the construction shown, the ECM 110 also includes a temperature sensor 140 positioned within the housing of the ECM 110. In some embodiments, the temperature sensor 140 is positioned adjacent components of the ECM 110 that generate the largest amount of heat (e.g., IGBTs, FETs, etc.) The temperature sensor 140 detects the temperature within the housing and provides a signal indicative of the temperature to the controller.

Figure 2:
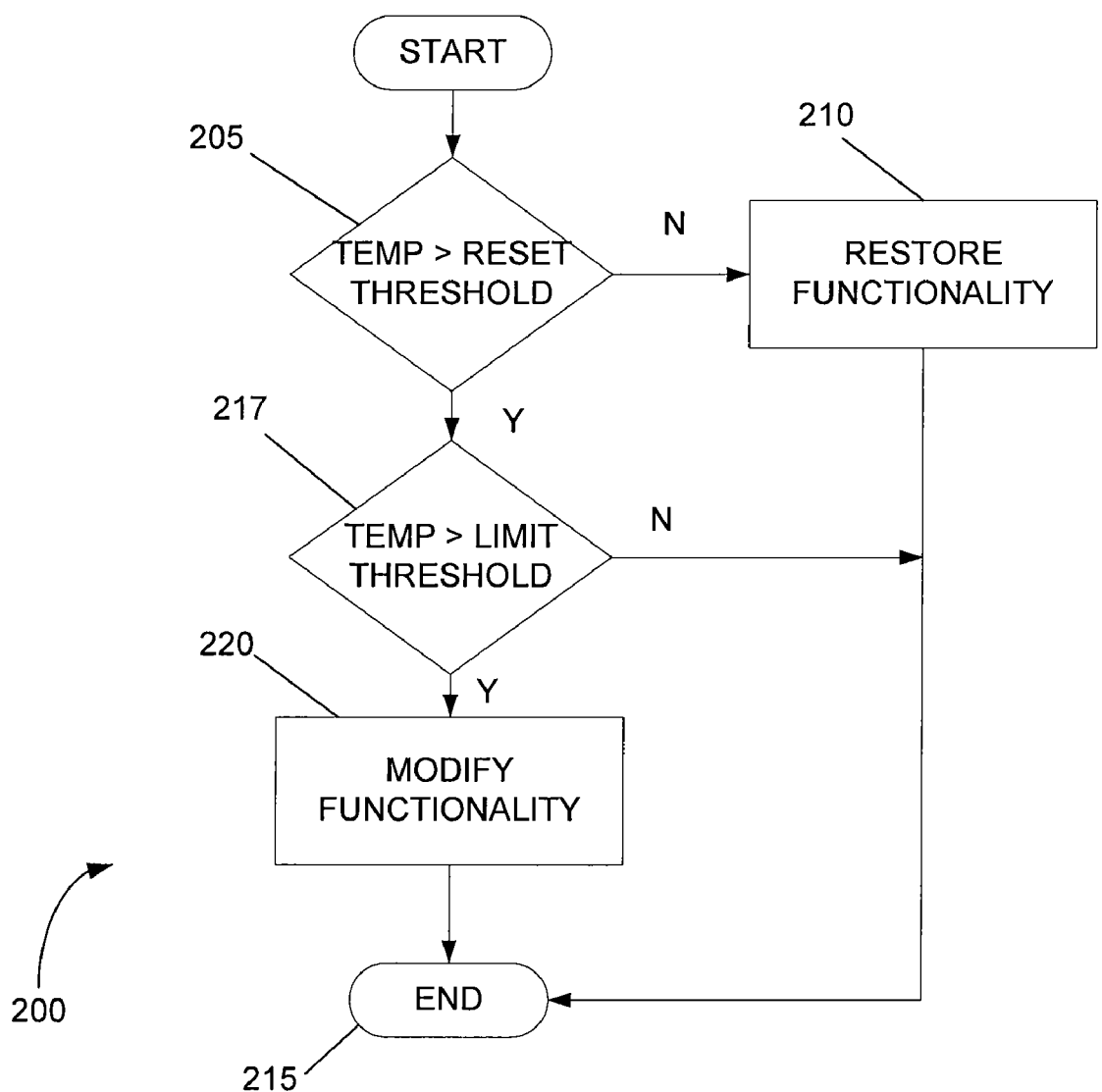
FIG. 2 is a flow chart of a first embodiment of a process for reducing a temperature of an ECM.

FIG. 2 shows a process 200 for shedding or reducing non-critical functions of the ECM 110 to reduce heat emissions by components of the ECM 110. The process 200 enables the ECM 110 to be manufactured using fewer components, less costly components, or both. The process 200 uses a pair of temperature thresholds—a reset temperature threshold and a limit temperature threshold. The limit temperature threshold can be determined by experimentation or can be calculated. The limit temperature threshold is chosen such that the heat generated by the execution of additional critical functions would cause a rise in temperature in the ECM 110 that would result in the temperature of the ECM 110 exceeding the rated operating temperature of the components of the ECM 110 (or another limiting threshold). The reset temperature threshold is chosen to prevent continuous cycling of the functionality of the ECM 110 (e.g., providing a hysteresis band). Thus, the reset temperature threshold is set at a predetermined temperature below the limit temperature threshold (e.g., by 2° C.).

The process 200 is executed on a predetermined basis (e.g., once every second). The process 200 begins by determining if the temperature in the ECM 110 (e.g., sensed by the temperature sensor 140) exceeds the reset temperature threshold (step 205). If, at step 205, the temperature does not exceed the reset threshold, the ECM 110 restores the full functionality of the non-critical operations (step 210) and exits the process 200 (step 215).

However, if the temperature exceeds the reset threshold, the ECM 110 determines if the temperature in the ECM 110 exceeds the limit temperature threshold (step 217). If the temperature does not exceed the limit threshold, the ECM 110 exits the process (step 215).

If the temperature exceeds the limit threshold, the ECM 110 modifies (e.g., reduces or terminates) the functionality of selected (i.e., all or a subset of) non-critical functions (step 220) to ensure that the temperature in the ECM 110 will not rise above the operating temperature range of the components of the ECM 110 should one or more ESC or other critical functions need to be performed. The process 200 is then exited (step 215).

Figure 3:
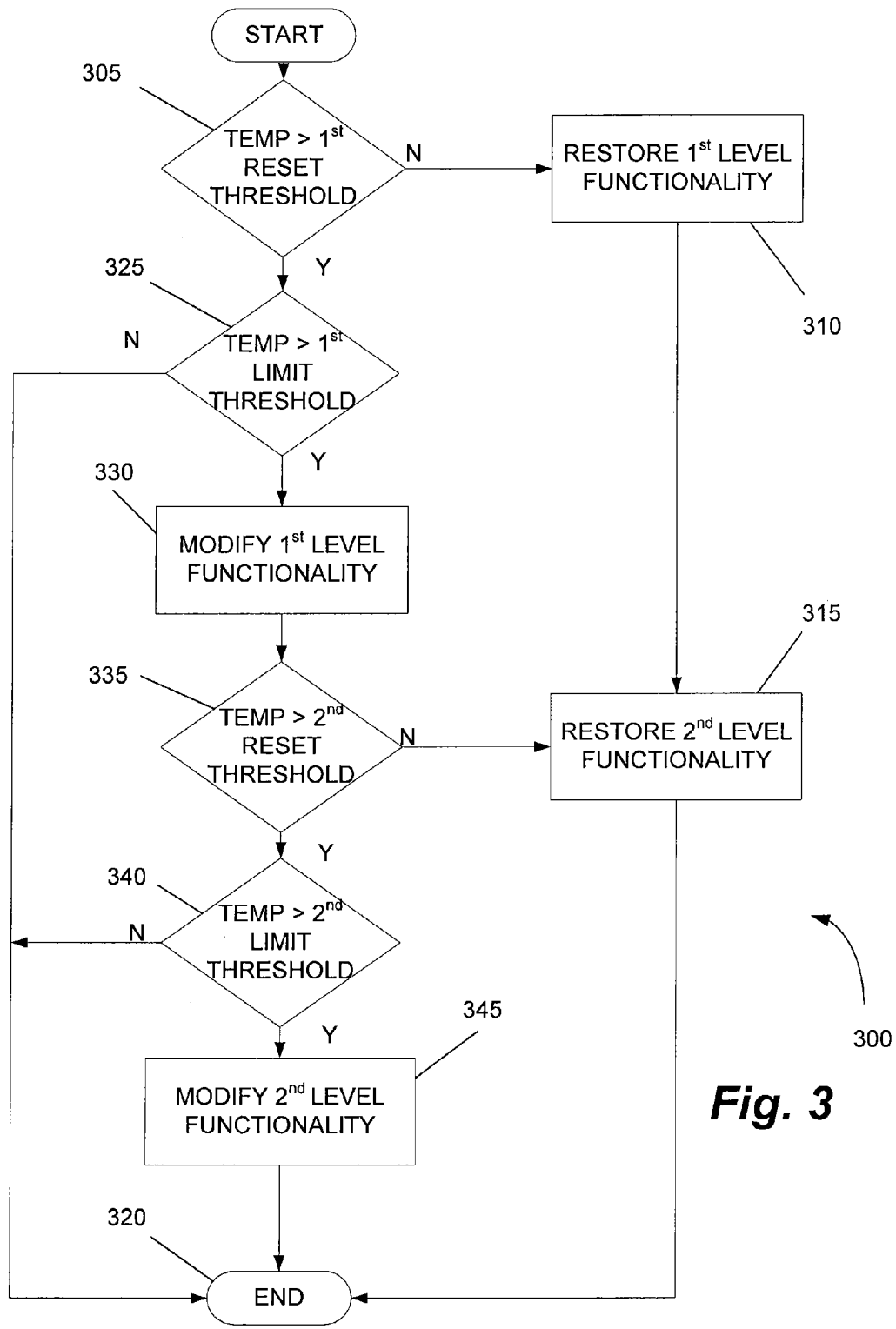
FIG. 3 is a flow chart of a second embodiment of a process for reducing a temperature of an ECM.

In some embodiments, non-critical functions and operations can be combined into groups. The groups can be based on different criteria such as the amount of heat generated by the function/operation or the level of comfort or discomfort provided to the occupants. FIG. 3 shows a process 300 for shedding or reducing non-critical functions of the ECM 110 in groups to reduce heat emissions by components of the ECM 110. The process 300 also enables the ECM 110 to be manufactured using fewer or less costly components.

The process 300 uses four temperature thresholds—a first and second reset temperature threshold and a first and second limit temperature threshold. The first and second limit temperature thresholds can be determined by experimentation or can be calculated. The first and second limit temperature thresholds are chosen such that the additional heat generated by the execution of additional critical functions would result in a temperature in the ECM 110 that would exceed the rated operating temperature of the components of the ECM 110.

The first and second reset temperature thresholds are chosen to prevent continuous cycling of the functionality of the ECM 110. Thus, the first reset temperature threshold is set at a predetermined temperature below the first limit temperature threshold (e.g., by 2° C.), and the second reset temperature threshold is set at a predetermined temperature below the second limit temperature threshold (e.g., by 2° C.). In addition, the first limit temperature threshold is set at a predetermined temperature below the second limit temperature threshold (e.g., by 10° C.). In some embodiments, the first limit temperature threshold is set based on an amount of heat generated by a first group of non-critical functions.

The process 300 is executed on a predetermined basis (e.g., once every second). The process 300 can provide added comfort to occupants of the vehicle by maintaining some of the non-critical functions when the temperature of the ECM 110 rises above the limit temperature threshold of the embodiment of the process 200 (FIG. 2). The process 300 begins by determining if the temperature in the ECM 110 (e.g., sensed by the temperature sensor 140) exceeds the first reset temperature threshold (step 305). If, at step 305, the temperature does not exceed the first reset temperature threshold, the ECM 110 restores full functionality of the first group of non-critical operations (step 310). The ECM 110 also restores the full functionality of a second group of non-critical operations (step 315), and exits the process 300 (step 320).

However, if the temperature at step 305 did exceed the first reset temperature threshold, the ECM 110 determines if the temperature in the ECM 110 exceeds the first limit temperature threshold (step 325). If, at step 325, the temperature does not exceed the first limit temperature threshold, the ECM 110 exits the process 300 (step 320). If the temperature exceeds the first limit temperature threshold, the ECM 110 modifies (e.g., reduces or terminates) the functionality of the first group of non-critical functions (step 330) to ensure that the temperature in the ECM 110 will not rise above the operating temperature range of the components of the ECM 110 should one or more ESC or other critical functions need to be performed. The ECM 110 next checks if the temperature of the ECM 110 exceeds a second reset temperature threshold (step 335). If the temperature does not exceed the second reset temperature threshold, the ECM 110 restores the functionality of the second group of non-critical functions (step 315) and exits the process (step 320). Thus, if the temperature is between the first and second limit temperature thresholds, the ECM 110 executes the second group of non-critical functions, but not the first group, providing some additional comfort to the occupants of the vehicle 100.

If the temperature did exceed the second reset temperature threshold (step 335), the ECM 110 determines if the temperature in the ECM 110 exceeds the second limit temperature threshold (step 340). If the temperature does not exceed the second limit temperature threshold, the ECM 110 exits the process 300 (step 320). If, at step 340, the temperature did exceed the second limit temperature threshold, the ECM 110 modifies (e.g., reduces or terminates) the functionality of the second group of non-critical functions (step 345) to ensure that the temperature in the ECM 110 will not rise above the operating temperature range of the components of the ECM 110 should one or more ESC or other critical functions need to be performed. In some embodiments, a function is reduced as part of the first group, and is terminated entirely (or modified further) as part of the second group. The ECM 110 then exits the process 300 (step 320).

The invention can be applied to electronic systems that perform different levels/types of functions/operations (e.g., critical and non-critical functions/operations), and are susceptible to high temperatures (e.g., operating temperatures that exceed operational temperature ranges, where one level/type of functions/operations result in temperatures that exceed a lower range).

Thus, the invention provides, among other things, systems and methods for controlling the temperature of an ECM enabling the ECM to be manufactured using less expensive components having a reduced operating temperature range. Various features and advantages of the invention are set forth in the following claims.

What is claimed is:

1. An electronic control module for a vehicle, comprising:
a housing;
a temperature sensor positioned in the housing; and
a controller positioned in the housing and coupled to the temperature sensor, the controller including a processor, a memory, a plurality of switches, the controller performing a first function related to a comfort level of an occupant of the vehicle at a first level of functionality, detecting a temperature in the housing, and modifying the first function when the detected temperature exceeds a temperature threshold, wherein modifying the first function reduces a quantity of heat generated by the controller, and wherein the first function includes at least one of wave-shaping functions to reduce Electro-Magnetic Interference (EMI) emissions and functions to control Noise Vibration and Heat (NVH).

2. The electronic control module of claim 1, wherein modifying the first function includes at least one of reducing a functionality of the first function and terminating the first function.

3. The electronic control module of claim 2, wherein the first level of functionality of the first function is restored when the detected temperature is below the temperature threshold.

4. The electronic control module of claim 1, wherein a plurality of components of the electronic control module have a maximum operating temperature of less than 85° C.

5. The electronic control module of claim 1, wherein at least the processor and the memory have a maximum operating temperature of less than 85° C.

6. The electronic control module of claim 1, wherein the electronic control module performs a second function related to a comfort level of the occupant of the vehicle, the electronic control module modifying the second function when the detected temperature exceeds a second temperature threshold.

7. The electronic control module of claim 6, wherein the second temperature threshold is higher than the temperature threshold.

8. A method of operating an electronic control module for a vehicle to reduce a rise in temperature within a housing of the electronic control module, the electronic control module including a temperature sensor, a processor, a memory, and a plurality of switches, the method comprising:
    performing a plurality of functions to increase a comfort level of an occupant of the vehicle, the plurality of functions having a first level of functionality;
    detecting a temperature in the housing;
    determining whether the detected temperature exceeds a temperature threshold; and
    modifying the plurality of functions when the detected temperature exceeds the temperature threshold to reduce a quantity of heat generated by the electronic control module, and
    wherein the plurality of functions include at least one of wave-shaping functions to reduce Electro-Magnetic Interference (EMI) emissions and functions to control Noise Vibration and Heat (NVH).

9. The method of claim 8, wherein modifying the plurality of functions includes at least one of reducing and terminating a functionality of at least one of the plurality of functions.

10. The method of claim 8, further comprising restoring the first level of functionality of the plurality of functions when the detected temperature is below the temperature threshold.

11. The method of claim 8, wherein a plurality of components of the electronic control module have a maximum operating temperature of less than 85° C.

12. The method of claim 8, wherein at least the processor and the memory have a maximum operating temperature of less than 85° C.

13. The method of claim 8, further comprising performing a second plurality of functions to increase a comfort level of the occupant of the vehicle having a second level of functionality, and modifying the second plurality of functions when the detected temperature exceeds a second temperature threshold.

14. The method of claim 13, wherein the second temperature threshold is higher than the temperature threshold.

15. The method of claim 13, further comprising restoring the second level of functionality of the second plurality of functions when the detected temperature is below the second temperature threshold.

* * * * *